United States Patent
Davis

(10) Patent No.: US 9,934,696 B2
(45) Date of Patent: Apr. 3, 2018

(54) TABLETOP TEACHING DEVICE AND METHOD OF USING THE SAME

(71) Applicant: Wayne L. Davis, Aiken, SC (US)

(72) Inventor: Wayne L. Davis, Aiken, SC (US)

( * ) Notice: Subject to any disclaimer, the term of this patent is extended or adjusted under 35 U.S.C. 154(b) by 0 days.

(21) Appl. No.: 15/264,760

(22) Filed: Sep. 14, 2016

(65) Prior Publication Data
US 2017/0004716 A1    Jan. 5, 2017

Related U.S. Application Data

(63) Continuation of application No. 14/067,761, filed on Oct. 30, 2013, now abandoned.

(60) Provisional application No. 61/863,805, filed on Aug. 8, 2013.

(51) Int. Cl.
*G09B 9/00* (2006.01)
*G09B 19/00* (2006.01)
*A63F 3/00* (2006.01)
*G09B 1/04* (2006.01)

(52) U.S. Cl.
CPC ............ *G09B 9/00* (2013.01); *G09B 19/00* (2013.01); *A63F 3/00148* (2013.01); *A63F 2003/00343* (2013.01); *G09B 1/04* (2013.01)

(58) Field of Classification Search
CPC ........ G09B 25/00; G09B 29/001; G09B 9/00; A63H 3/52; A63F 13/822; A63F 3/00
See application file for complete search history.

(56) References Cited

PUBLICATIONS

"Transparent Battlemats?" EnWorld, http://www.enworld.org/forum/showthread.php?68374-Transparent-Battle-Mats, Nov. 5, 2003.*
"The Nutshell Studies: How a Wealthy Grandmother Revolutionized Crime Scene Investigation," Lammle, mentalfloss.com, http://mentalfloss.com/article/12757/nutshell-studies-how-wealthy-grandmother-revolutionized-crime-scene-investigation, Oct. 10, 2012.*
"Welcome to the Dollhouses of Death," Sachs, popsci.com, https://web.archive.org/web/20081209020059/https://www.popsci.com/scitech/article/2003-04/welcome-dollhouses-death, Apr. 29, 2003.*

* cited by examiner

*Primary Examiner* — Thomas Hong
*Assistant Examiner* — Jennifer L Korb
(74) *Attorney, Agent, or Firm* — Dunlap Bennett & Ludwig PLLC

(57) ABSTRACT

A tabletop teaching device and a method of using the same may include a box having an interior housing, a top and a floor. The box may include within the interior housing, at least one printout of a scene placed on the floor of the box, at least one printout of a grid placed over the at least one printout of a scene, and at least one miniature item placed above the at least one printout of a grid, wherein each miniature item represents a potential victim, a fixed point, an object item, or a potential weapon. An instructor can then place a potential victim miniature item and a fixed point miniature item spaced apart along the at least one grid printout so as to instruct a first student to determine distances and angles between the potential victim utilizing the grid of the at least one printout of a grid.

6 Claims, 4 Drawing Sheets

TABLETOP TEACHING DEVICE AND METHOD OF USING THE SAME

CROSS-REFERENCE TO RELATED APPLICATION

This application claims the benefit of U.S. provisional application No. 61/863,805, filed Aug. 8, 2013, and U.S. non-provisional application Ser. No. 14/067,761, filed Oct. 30, 2013, the contents of which are herein incorporated by reference.

BACKGROUND OF THE INVENTION

The present invention relates to police teaching and, more particularly, to a device that helps police teach investigations.

Crime scenes, traffic investigations and incident reports are difficult, if not impossible, to conduct inside a classroom. This becomes especially true if the class is online. Currently, products are software based and do not teach realistic crime scene photographing and sketching techniques. In addition, other products do not allow for the photograph of the scene to be compared directly to the sketch of the scene for accuracy. Other products require officers to transform their sketches into electronic diagrams and are only two dimensional. Some colleges may purchase lab equipment and set up real crime scenes at the school. Lab equipment is costly and not always practical, especially for online courses.

As can be seen, there is a need for a teaching assisting device that may provide police scenes with three dimensional items that a police officer may come upon in the field.

SUMMARY OF THE INVENTION

In one aspect of the present invention, a tabletop teaching device comprises: a box having an interior housing and a floor; at least one printout of a scene placed on the floor of the box; at least one printout of a grid placed over the at least one printout of a scene; and at least one miniature item placed above the at least one printout of a grid.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tabletop teaching device that may include a box having an interior housing, a top and a floor. The box may include within the interior housing, at least one printout of a scene placed on the floor of the box, at least one printout of a grid placed over the at least one printout of a scene, and at least one miniature item placed above the at least one printout of a grid. A transparent top may cover the top of the box. A cover may be placed under the at least one miniature item and overlay the at least one printout of the grid.

Figure 1:
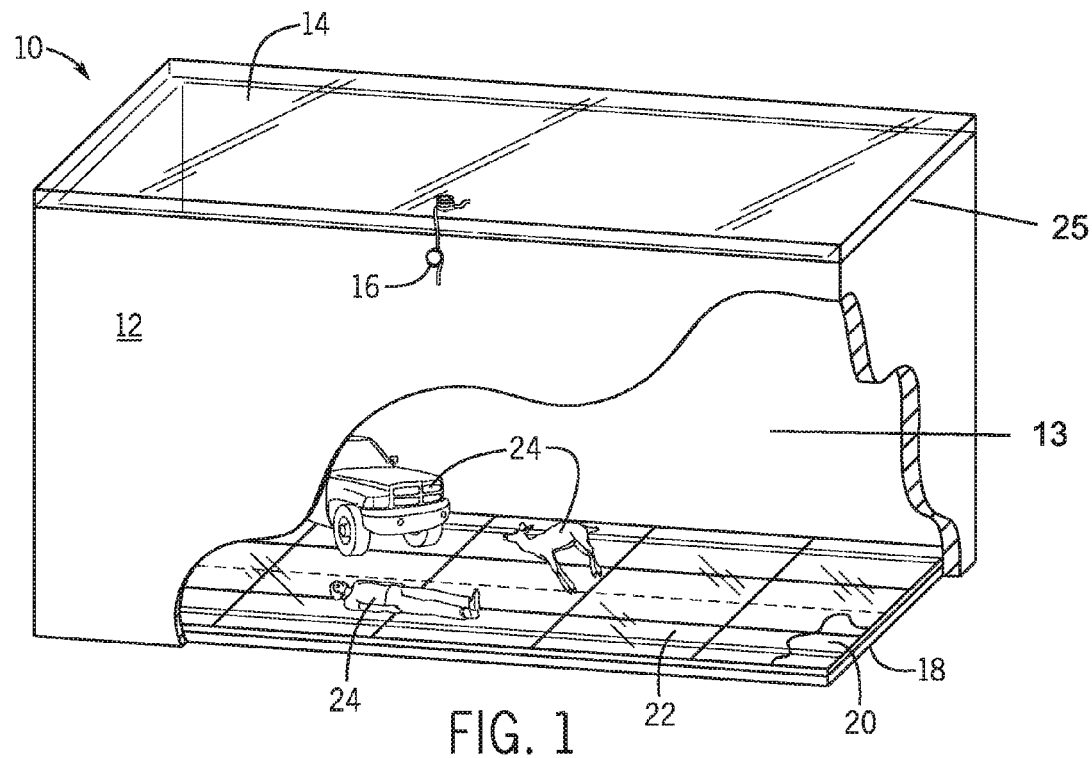
FIG. 1 is a perspective view of an exemplary embodiment of the present invention with parts broken away.
Figure 7:
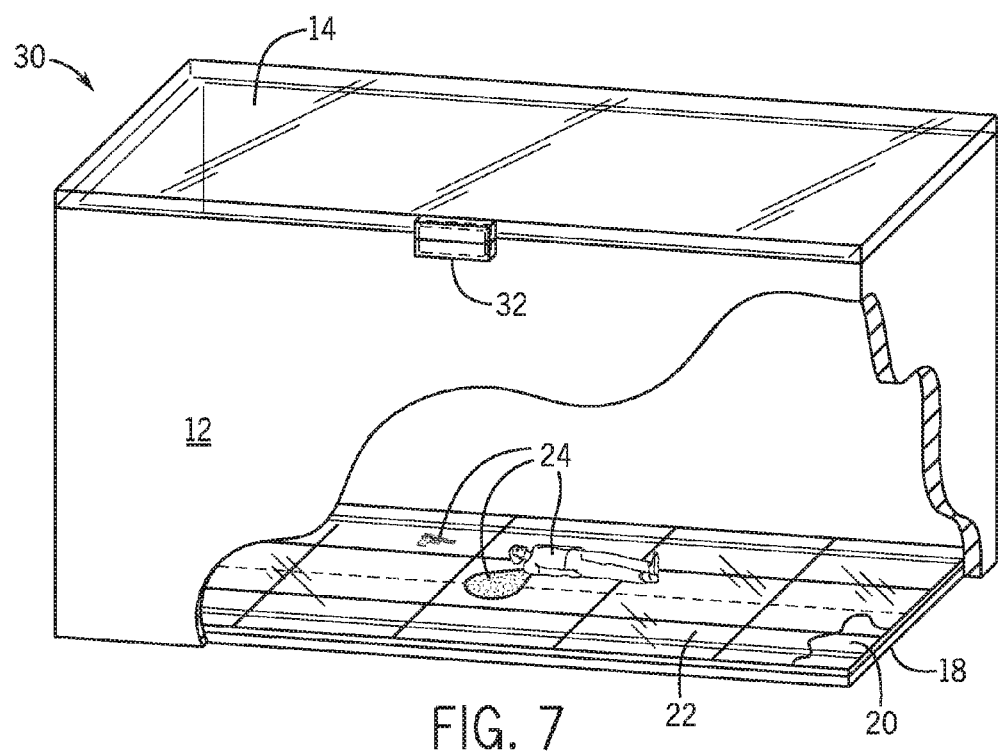
FIG. 7 is a perspective view of an alternate embodiment of the present invention.
Figure 2:
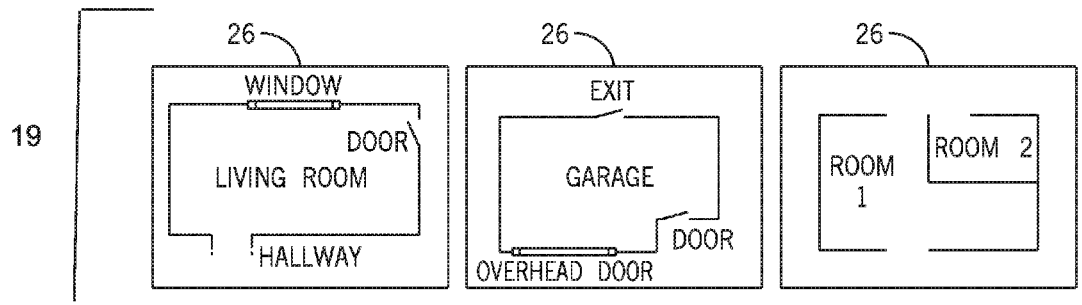
FIG. 2 is a top plan view of printed graphics of an exemplary embodiment of the present invention.
Figure 3:
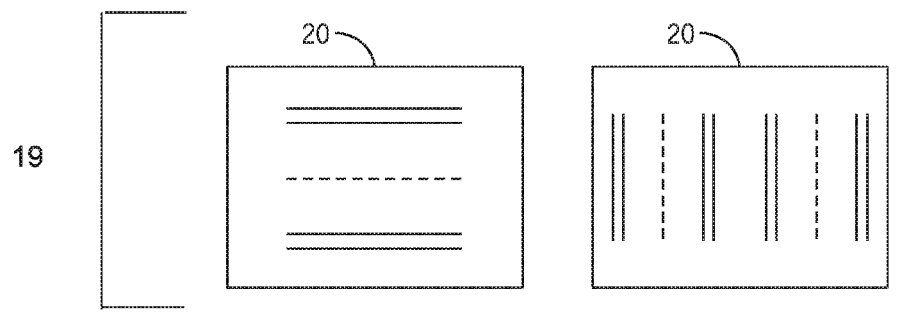
FIG. 3 is a top plan view of an alternate set of printed graphics of an exemplary embodiment of the present invention.
Figure 4:
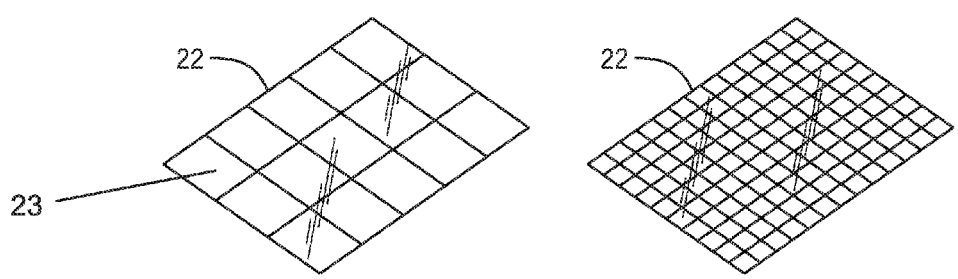
FIG. 4 is a perspective view of clear overlays with grids of an exemplary embodiment of the present invention.
Figure 5:
FIG. 5 shows a collection of assets of an exemplary embodiment of the present invention.
Figure 6:
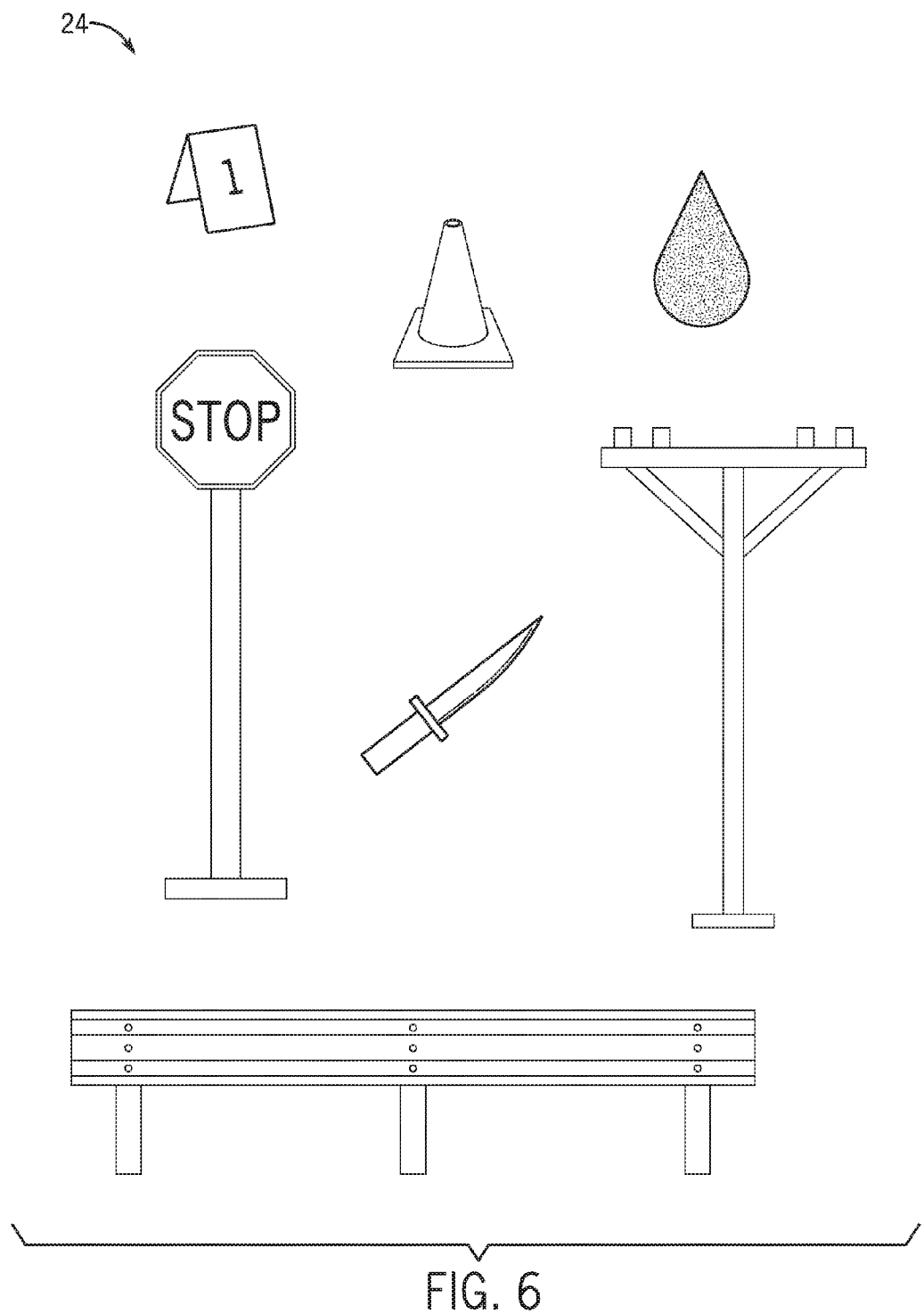
FIG. 6 shows an additional collection of assets of an exemplary embodiment of the present invention.

As is illustrated in FIGS. 1 through 7, the tabletop teaching device 10 may include a box 12. The box 12 may have an interior housing 13, a top 25 and a floor 18. Placed along the floor 18 of the box 12 may be at least one printout of a scene 19. The at least one printout of a scene 19 may be an indoor scene 26 or an outdoor scene 20 as shown in FIGS. 2 and 3. The indoor scene 26 may be from a living room, a garage, a bedroom or the like. The outdoor scene 20 may be a one way road, a two lane highway, or the like. Placed above the at least one printout of a scene 19 may be at least one printout of a grid 22. The at least one printout of a grid 22 may come in many different grid sizes depending on the scene that is being represented in the tabletop teaching device 10. In certain embodiments, a cover 23 may be placed over the at least one printout of the grid 22. In alternate embodiments, the at least one printout of a grid 22 may be made with a cover 23 permanently overlaid. The cover 23 may be made from a material that may be easily washed such as vinyl and the like.

In certain embodiments, at least one miniature item 24 may be placed above the at least one printout of a grid 22. In certain embodiments, the at least one miniature item 24 may be placed over the cover 23. The at least one miniature item 24 may create a police scene. Police scenes may be photographed and sketched. With the at least one printout of a grid 22, various measurements may be obtained and calculations may be performed. In addition, after one student photographs and sketches and takes measurements, the scene may be disassembled and afterwards, a second student may recreate the original scene based on the data provided by the first student. Incomplete scenes may also be set up and students may demonstrate proper positioning. The printout of the scene 19, the printout of a grid 22, the cover 23 and the miniature items 24 all may be within the interior housing 13 of the box 12. In certain embodiments, a transparent top 14 may be attached to the top 25 of the box 12. In certain embodiments, a fastener 32 may be used to keep the transparent top 14 on the box 12. The fastener 32 may be a latch, such as a string latch 16 or the like.

In certain embodiments, the at least one miniature item 24 may be an individual in multiple potential positions such as standing, lying down and the like. The at least one miniature item 24 may include a vehicle, multiple vehicles, potential weapons such as guns, knives and the like. The at least one miniature item 24 may include objects that may be around a potential victim such as a phone, an digital music player, animals, documents, tools and the like. The at least one miniature item 24 may include items found indoors or on a street such as stop signs, wire poles, cones and the like. The miniature items 24 shown in FIGS. 5 and 6 may be included, but are not limited to these items.

A method of using the device may include the following: having a student photograph and sketch the crime and crash scenes created using the box, the at least one printout of a scene placed on the floor of the box, the at least one printout of a grid placed over the at least one printout of a scene, and the at least one miniature item placed above the at least one printout of a grid. The student may take accurate measurements, set up felony stops, mark crime scene evidence, photograph and sketch the scene, and conduct calculations. Calculations may be made such as determining distances and angles between miniature items, vehicle speed via skid mark analysis, blood splatter analysis, and the like, from the tabletop teaching device. The information collected may be compared directly to a police report the student may write. By having the student take measurements from fixed points, the student may be learning real world police applications. The student may have to obtain all the necessary information that may be required in a police report. Students may obtain all of the information that actual officers would need to obtain in the field. In addition, students may demonstrate police actions such as the shooting of a deer, by positioning miniature people and items. The information collected may be compared to the student's sketch in a firearms report. In certain embodiments, the tabletop teaching device may be applied to other fields such as firefighting training, applied mathematics, or photographing.

In one aspect of the present invention, a method of teaching crime scene analysis, includes the steps of: providing at least one scene printout of a predetermined crime scene; providing at least one printout of a grid; providing a plurality of miniature items, wherein each miniature item represents a potential victim, a fixed point, an object item, or a potential weapon; placing the at least one printout of a grid over the at least one scene print; placing a potential victim miniature item and a fixed point miniature item spaced apart along the at least one grid printout; and instructing a first student to determine distances and angles between the potential victim utilizing the grid of the at least one printout of a grid.

In another aspect of the present invention, the method of teaching crime scene analysis the steps include instructing the first student to sketch the predetermined crime scene based in part on the determined distances and angles; instructing the first student to photograph the predetermined crime scene based in part on the determined distances and angles; placing an object miniature item along the at least one grid printout spaced apart from the fixed point miniature item, wherein the at least one object miniature item represents victim blood, and further comprising instructing the first student to perform a blood splatter analysis relative to the potential victim miniature based in part on the determined distances and angles; instructing a second student to recreate the predetermined crime scene based on the distances and angles determined by the first student; instructing a second student to recreate the predetermined crime scene based on the sketch of the predetermine scene created by the first student; instructing a second student to recreate the predetermined crime scene based on the photograph of the predetermine scene created by the first student; instructing a second student to recreate the predetermined crime scene based on the blood splatter created by the first student.

Unlike electronic scenes, the table top device and the method of using the same allows for the actual collection of physical evidence. Student can do the following: physically collect and seal any evidence at the scene (e.g., a weapon) and complete the chain of custody police report; demonstrate proper crime scene search patterns by placing evidence markers at the scene in the correct locations; and demonstrate the proper crime scene investigation techniques in the correct order (sketch scene, photograph scene, collect evidence).

It should be understood, of course, that the foregoing relates to exemplary embodiments of the invention and that modifications may be made without departing from the spirit and scope of the invention as set forth in the following claims.

What is claimed is:

1. A method of teaching crime scene analysis, comprising the steps of:
   providing a teaching device having a plurality of vertical walls extending from a periphery of a horizontal floor surface, wherein the plurality of vertical walls defines bounds of a predetermined crime scene, and wherein the teaching device is dimensioned to be accommodated by a tabletop;
   the horizontal floor surface providing a grid defining a plurality of fixed points;
   positioning at least one fixed-point item along the horizontal floor surface;
   positioning at least one miniature crime scene asset along the horizontal floor surface;
   identifying the at least one fixed-point item; determining distances between the at least one fixed-point item and the at least one miniature crime scene asset utilizing the grid, whereby identifying the fixed-point item facilitates learning real-world police applications; creating a sketch of the predetermined crime scene based in part on the determined distances; removing the at least one miniature crime scene asset from its respective position; and repositioning the at least one miniature crime scene asset based on the sketch of the predetermined crime scene.

2. The method of claim 1, wherein each fixed-point item represents a stop sign, wire pole, fire hydrant, or bench,
   whereby the fixed-point item represents an object police standardly use to establish a fixed point during outdoor crime scene reporting.

3. The method of claim 2, wherein each miniature crime scene asset represents simulated victim blood, a crime victim, or a crime weapon.

4. A method of teaching crime scene analysis, comprising the steps of:
   providing a teaching device having a plurality of vertical walls extending from a periphery of a horizontal floor surface, wherein the plurality of vertical walls defines bounds of a predetermined crime scene, and where the teaching device is dimensioned to be accommodated by a tabletop;
   the horizontal floor surface providing a grid defining a plurality of fixed points;
   positioning at least one fixed-point item along the horizontal floor surface;
   positioning at least one miniature crime scene asset along the horizontal floor surface;
   identifying the at least one fixed point item;
   determining distance between the at least one fixed-point item and the at least one miniature crime scene asset utilizing the grid,
   whereby identifying the fixed-point item facilitates learning real-world police applications;
   creating a photograph of the predetermined crime scene based in part on the determined distances;
   removing the at least one miniature crime scene asset from its respective position; and repositioning the at least one miniature crime scene asset based on the photograph of the predetermined crime scene.

5. The method of claim 4, wherein each fixed-point item represents a stop sign, wire pole, fire hydrant, or bench, whereby the fixed-point item represents an object police standardly use to establish a fixed point during outdoor crime scene reporting.

6. The method of claim 5, wherein each miniature crime scene asset represents simulated victim blood, a crime victim, or a crime weapon.

* * * * *